United States Patent [19]

Poncelet

[11] Patent Number: 5,599,588
[45] Date of Patent: Feb. 4, 1997

[54] PROCESS FOR PREPARING METAL HALIDES BY THE SOL-GEL-METHOD

[75] Inventor: Oliver J. C. Poncelet, Chalon sur Soane, France

[73] Assignee: Eastman Kodak Company, Rochester, N.Y.

[21] Appl. No.: 557,509

[22] Filed: Nov. 14, 1995

[30]     Foreign Application Priority Data

Nov. 23, 1994 [FR]  France .................. 94 14309

[51] Int. Cl.⁶ .............. C01F 17/00; C01F 5/26; C01F 11/20; C01F 3/00
[52] U.S. Cl. ............ 427/343; 423/263; 423/466; 423/490; 423/497; 501/12; 501/37; 501/40; 427/336; 427/65; 427/100
[58] Field of Search .................. 423/490, 263, 423/489, 464, 497, 466; 427/64, 65, 126.3, 100, 126.2, 164, 165, 336, 343; 501/12, 37, 40, 151, 152

[56]         References Cited

U.S. PATENT DOCUMENTS

| | | | |
|---|---|---|---|
| 3,975,416 | 8/1976 | Mazdiyasni et al. | 534/15 |
| 4,982,019 | 1/1991 | Purdy et al. | 568/842 |
| 5,051,278 | 9/1991 | Paz-Pujalt | 427/64 |
| 5,112,676 | 5/1992 | Cot et al. | 423/593 |
| 5,114,738 | 5/1992 | Savage et al. | 427/166 |
| 5,132,253 | 7/1992 | Dawes | 423/155 |
| 5,268,196 | 12/1993 | Boulos et al. | 427/165 |
| 5,271,956 | 12/1993 | Paz-Pujalt | 427/100 |
| 5,277,889 | 1/1994 | Power et al. | 423/490 |
| 5,304,533 | 4/1994 | Kobayashi et al. | 423/263 |
| 5,342,809 | 8/1994 | Poulain | 501/12 |

FOREIGN PATENT DOCUMENTS

| | | | |
|---|---|---|---|
| 1-31789 | 2/1989 | Japan . | |
| 1-31790 | 2/1989 | Japan . | |
| 4-42802 | 2/1992 | Japan | 423/490 |

*Primary Examiner*—Michael Lewis
*Assistant Examiner*—Peter DiMauro
*Attorney, Agent, or Firm*—Raymond L. Owens

[57]             ABSTRACT

The present invention concerns a process for obtaining metal halides, in particular rare earth and/or alkali earth halides. This process consists of forming a homogeneous solution by mixing one or more rare earth and/or alkali earth halogenoalkoxides in an anhydrous organic solvent, and hydrolyzing this solution. The novel materials are obtained at room temperature and are in powder, fibre, film or bulk material form.

10 Claims, 5 Drawing Sheets

PROCESS FOR PREPARING METAL HALIDES BY THE SOL-GEL-METHOD

FIELD OF THE INVENTION

The present invention concerns a process for obtaining metal halides, in particular rare earth and/or alkaline earth halides, and novel materials in powder, film or bulk material form obtained from these metal halides.

BACKGROUND OF THE INVENTION

Metal halides are compounds which have been known for a long time. For example, alkaline earth fluorides (group IIA), 4th period transition metal fluorides or rare earth fluorides (group IIIB) are known. These metal fluorides have interesting electrical, magnetic and optical properties.

Alkaline earth fluorides have low refractive indexes, which enables them to be used in an anti-reflective layer on supports with a high reflective index.

The layers obtained from these fluorides in general have low dielectric constants, are transparent and have excellent mechanical properties.

All these special properties mean that metal fluorides are compounds which are advantageous for piezoelectric, ferromagnetic or antiferromagnetic, electro-optical, pyroelectrical or non-linear optics applications.

Mixed rare earth and alkaline earth metal halides are also known as luminescent substances used for example to convert X-rays or gamma radiation into visible light.

Many publications describe the use of mixed alkaline earth halides as luminescent substances, in particular in radiographic products.

For example, European patent EP 149148 describes radiographic image recording screens which contain, in the storage layer, a mixed alkaline earth halide of general formula BaF(XY):Eu:Sr in which X and Y are halide atoms. These luminescent substances are obtained by mixing $BaF_2$, $BaCl_2$, $BaBr_2$, $EuF_3$ and $SrCl$ in a ball mill. The mixture is then baked red hot in a bromium vapour chamber for 1 to 5 hours at a temperature of between 800° and 1000° C. After cooling, the product is broken up, washed and then dried. In this way the luminescent substance described above is obtained. This technique, which is difficult to implement, does not make it possible to control the stoichiometry of the final product.

It is known that thin layers of luminescent substances can be formed by chemical vapour phase deposition. Such layers are obtained with difficulty because of the differences in vapour tension and stability of each of the constituents.

A process for obtaining layers of metal fluorides was described in U.S. Pat. No. 3,475,192. Such a process consists of coating, on a substrate, a magnesium fluoride solution in a polar solvent and heating the substrate thus covered at between 100° and 1000° C. In this process, it is necessary, in order to obtain a film, to use a substrate which is resistant to high temperatures.

It is known that metal fluoride layers can be obtained by the decomposition of a metal fluoride precursor.

For example, in U.S. Pat. No. 4,492,721, magnesium fluoride layers are obtained by the decomposition of fluorinated organic compounds of magnesium, such as magnesium trifluoroacetate.

U.S. Pat. Nos. 5,051,278 and 5,271,956 describe a process for forming films of metal fluorides, in particular binary and ternary alkaline earth or lanthanide fluorides. This process consists of forming a coating solution containing a non-fluorinated organometallic compound, a solvent and a fluorination agent and coating this solution on a support. The film thus obtained is then heated at a temperature of approximately 500° C. in order to decompose the products contained in the coating solution into pure metal fluoride. In order to obtain a uniform layer, a temperature increase is effected with a gradient of around 50° C./min.

U.S. Pat. Nos. 5,208,101 and 5,268,196 describe a process for forming layers comprising alkali metal or alkaline earth fluorides using sol-gel technology. This process consists of forming a layer on a glass substrate using a coating solution containing a light metal oxide precursor, a non-aqueous solvent and water, heating the layer in order to densify the layer of light metal oxides, and exposing this densified layer at a high temperature to a gaseous current containing fluorine. The densification of the oxide layer is effected at a temperature of around 500° C. and the fluorination is effected at temperatures of around 300° C.

In all the known processes set out above, the metal halide layers are obtained using high temperatures, either to vaporise the metal halides or to decompose a precursor of the metal halides, or to densify the base metal oxide layer and to halogenate this same layer.

All these processes enabling layers of metal halides to be obtained have many drawbacks related to the necessity to use high temperatures. In particular, the choice of the support for the metal halide layer is very limited. In addition, at high temperature, it is very difficult to obtain homogeneous metal halide layers having controlled stoichiometry.

SUMMARY OF THE INVENTION

The object of the present invention concerns a process for obtaining homogeneous metal halides at low temperature, in powder, layer, fibre or bulk material form.

The present invention makes it possible to eliminate the problems relating to the use of high temperatures. For example, the process of the present invention makes it possible to obtain metal halide layers on a much wider variety of supports, in particular organic supports which have very little resistance to high temperatures.

The above object is achieved in a process for preparing rare earth and/or alkaline earth metal halides which comprise:

(1) forming a homogeneous solution by mixing one or more rare earth and/or alkaline earth halogenoalkoxides in an anhydrous organic solvent; and (2) adding to this solution a quantity of water which is at least stoichiometric for hydrolysing the halogenoalkoxides.

Within the scope of the invention, the halogenoalkoxides and consequently the metal halides may contain one or more halogen atoms chosen from amongst fluorine, bromine, chlorine and iodine.

DETAILED DESCRIPTION OF THE INVENTION

Figure 1:
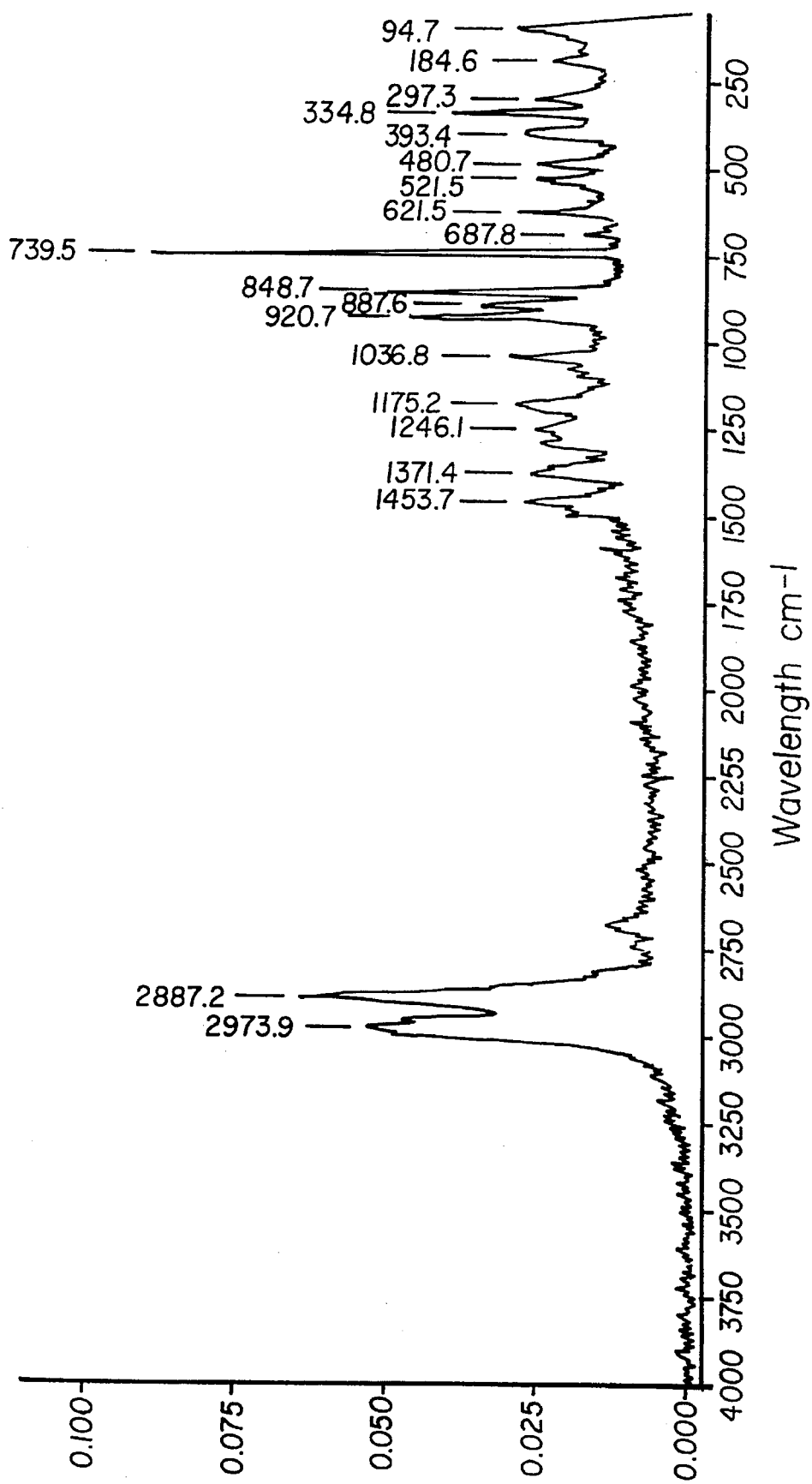
FIG. 1 is an FT-Raman spectrum of the barium fluoroalkoxide used to obtain, according to the invention, barium fluoride.

The metal halides which can be obtained by the process of the present invention are for example halides of elements in group IIA such as beryllium, magnesium, calcium, strontium, barium or radium halides or halides of elements in group IIIB, such as scandium, yttrium, lanthane and cerium, gadolinium, erbium or ytterbium halides. For example, the metal halides which can be obtained are barium bromide, barium fluoride, barium bromofluoride, magnesium fluoride, magnesium bromide, ytterbium fluoride, barium and thulium fluoride, cerium bromide, cerium (III) fluoride, europium fluoride, etc.

According to the invention, mixed metal halides, for example rare earth and alkaline earth halides, can also be obtained.

The alkaline earth and/or rare earth halides of the invention are obtained from one or more rare earth and/or alkaline earth halogenoalkoxides, which can be obtained by any one of the known methods of the art. These halogenoalkoxides are put in solution in an anhydrous solvent, which may be chosen from a large number of organic solvents. The preferred solvents of the invention are anhydrous organic solvents which are miscible in water, such as, for example, tetrahydrofurane, alcohols or ketones.

The rare earth and/or alkaline earth halogenoalkoxides are in general obtained from the corresponding alkaline earth or rare earth alkoxide or alkoxides.

The preparation of the alkaline earth alkoxides may be effected by various syntheses known in the art.

The easiest synthesis to implement consists of reacting an alcohol directly on an alkaline earth. The yield of such a synthesis depends in particular on the steric hindrance of the alcohol used. The smaller the steric hindrance, the faster will be the synthesis of the alkaline earth alkoxides. The alcohol is preferably chosen from amongst methanol, ethanol or propanol.

The rare earth alkoxides can be synthesised according to one of the following two methods.

The first method consists of reacting a rare earth chloride, for example lanthane chloride, directly with an alkali metal alkoxide, for example a sodium or lithium alkoxide. This synthesis has drawbacks related to the presence of chloride in the reaction medium. In addition, lanthanide chlorides are particularly stable chemical species which are difficult to activate, which gives rise to low reaction yields.

A second method of synthesising rare earth alkoxides consists of reacting the rare earth directly with an alcohol such as 2-propanol or a functionalised alcohol such as 2-methoxyethanol.

Within the scope of the invention, it is also possible to use heterometal oxides obtained by mixing several homometal oxides.

According to the present invention, the rare earth or alkaline earth halogenoalkoxides of the invention are obtained by alcoholisation of rare earth or alkaline earth alkoxides by a halogenated or perhalogenated alcohol hereinafter referred to as a "halogenoalcohol".

For example, when it is desired to prepare metal fluorides according to the process of the present invention, it is possible to prepare the corresponding rare earth and/or alkaline earth fluoroalkoxide by reacting one or more rare earth and/or alkaline earth alkoxides with a fluoroalcohol chosen from amongst 1,1,1,3,3,3-hexafluro-2-propanol, perfluoro-tert-butanol, 2,2,2-trifluoroethanol, 2-fluoroethanol, 1,1,1,2,2,3,3-heptafluoro-4-butanol or 2,2,3,4,4,4-hexafluoro-1-butanol.

When it is desired to prepare metal bromides according to the process of the present invention, it is possible to prepare the rare earth and/or alkaline earth bromoalkoxide by reacting one or more rare earth and/or alkaline earth alkoxides with a bromoalcohol chosen from amongst 2-bromoethanol, 3-bromo-2-propanol, 3-bromo-2-methyl-1-propanol or 3-bromo-2,2-dimethyl-1-propanol.

These halogenoalkoxides can be defined by the formula $M(ORx)_n(ORy)_m$ in which M is a rare earth or an alkaline earth, Rx and Ry are each separately alkyl groups containing one or more identical or different halogen atoms, and n and m are such that the sum of n and m is equal to the valency of M.

When it is desired to obtain a metal halide containing several halides, a halogenoalkoxide as defined above in which the groups Rx and Ry are differently halogenated is preferably used. It is also possible to use as a starting halogenoalkoxide a halogenoalkoxide of formula $M(ORx)_nX_m$ in which M, Rx, n and m as defined previously and X is a halogen atom.

The alkaline earth halogenoalkoxides can also be prepared by directly reacting the alkaline earth in solution in a polar solvent with a halogenoalcohol as defined previously. When fluoroalkoxides are prepared, the reaction is highly exothermic, which causes a degradation of the organic compounds present in the reaction medium. In this case, the reaction can be catalysed and must be carried out under very severe anhydrous conditions. When bromoalkoxides are prepared, the reaction is not exothermic and must be catalysed by forming in situ a highly reactive species such as an amidide by the addition of $NH_3$, $Et_2NH$ or $(Me_3Si)_2NH$ in the reaction medium.

According to one embodiment of the invention, in order to prepare a mixed metal halide containing several metal elements, each of the metal halogenoalkoxides forming part of the final composition of the metal halide are prepared separately.

According to the invention, the hydrolysis may be catalysed by means of an acid. Preferably, this acid is halogenated with the same halogen as the one constituting the final metal halide in order to avoid the presence of secondary products related to the counterion associated with the hydrogen. For example, hydrolysis of the fluoroalkoxides was effected at a pH of less than 7, and preferably between 1 and 3, in the presence of hydrofluoric acid.

The quantity of water used to hydrolyse the halogenoalkoxides according to the invention varies in accordance with the type of material desired. When it is desired to obtain the metal halides of the invention in the form of layers or fibres, hydrolysis of the halogenoalkoxides is effected with a quantity of water which is at least stoichiometric and less than 5 times, and preferably less than twice, this stoichiometric quantity.

When it is desired to obtain powders, this quantity of water may be up to 50 times and preferably 10 to 30 times greater than the stoichiometric quantity of water for hydrolysing the halogenoalkoxides.

The present invention surprisingly makes it possible to obtain pure rare earth or alkaline earth halides at low temperature. The process and the metal halides of the invention are particularly useful for manufacturing organic/inorganic devices in thin film, fibre or solid material form.

Within the scope of the invention, thin layers of metal halides were obtained dip-coating a support in a solution of metal halogenoalkoxides and hydrolysing the halogenoalkoxides of this layer solely by means of atmospheric moisture. The thickness of the layer can be varied either by varying the initial concentration of metal halogenoalkoxides or by dip-coating several times the support covered with a first layer obtained according to the process of the present invention.

The supports which can be used to obtain layers within the scope of the present invention can be conventional supports such as glass or ceramics or supports degradable at high temperature, such as supports made from organic polymer materials. The preferred organic supports are supports with reactive groups at the surface, for example hydroxyl groups as in cellulosic supports.

The deposition of a metal halide layer of the invention on a cellulose support makes it possible for example to improve the resistance to pH of such a support.

According to one embodiment, layers of metal fluorides on a cellulose support were thus obtained.

The process of the invention also makes it possible to obtain a material having a controlled stoichiometry since it is very easy to control the metal halogenoalkoxide concentration of the starting solution. In addition, since the layers of metal halides of the invention are obtained using perfectly homogeneous solutions, homogeneous metal halide layers are obtained, which is not the case with the prior art.

According to the prior art, it is known that, by hydrolysis of metal alkoxides, metal oxides are formed. Such a process is generally implemented at low temperature in order to form inorganic lattices of metal oxides, for example polysiloxane lattices.

It is therefore particularly surprising that, by hydrolysis of halogenoalkoxides, alkaline earth or rare earth halides rather than alkaline earth or rare earth oxides are obtained.

Without being bound by theoretical considerations, it appears that the hydrolysis conditions are particularly important for obtaining rare earth and/or alkaline earth halides. This is because it appears that rapid hydrolysis favours the formation of halides rather than the formation of oxides. Halogenoalkoxides, in particular fluoroalkoxides, have a hydrophobic character, which brings about the formation of micelles in the reaction medium. Each micelle fulfils the role of a microreactor in which the hydrolysis is accelerated, which favours the formation of metal halides rather than the formation of metal oxides.

EXAMPLES

All the following reactions were carried out in an inert gas, at room temperature.

The materials obtained were analysed by the following techniques:

FT-RAMAN spectroscopy, which consists of irradiating a sample with a monochromatic laser and measuring the frequency of the dispersed light.

X-ray diffraction, which consists of irradiating the surface of a sample by means of a beam of parallel monochromatic X-rays and studying the variation in intensity as a function of the angle of incidence. X-ray diffraction affords qualitative identification of the crystalline material and notably. determination of the crystalline structure.

Energy dispersive X-ray microanalysis spectroscopy (ED-XRMA), which enables the elements present in a sample to be identified. This identification is based on the exploitation of the X-rays emitted by a sample bombarded by an electron beam focused on the surface, each chemical element having a characteristic line.

From the teaching of the examples described below, rare earth and/or alkaline earth halides containing one or more halide atoms can easily be obtained.

EXAMPLE 1

Synthesis of $Ba[OCH(CF_3)_2]_2$ 38 g of 2-hexafluoropropanol is added to a mixture consisting of 15 g of barium (0.109 moles, Aldrich®) and 100 ml of anhydrous tetrahydrofurane. The mixture is left to react for 12 hours whilst being stirred (a highly exothermic reaction). The reaction medium is filtered and a colourless filtrate is recovered, which is then dried and crystallised in anhydrous hexane. In this way 48 g of $Ba[OCH(CF_3)_2]$ characterised by the Raman spectrum of FIG. 1 is obtained (yield 95%).

EXAMPLE 2

Synthesis of $Y[OCH(CF_3)_2]_2$ 100 ml of freshly distilled 2-propanol is added to a mixture consisting of 16.1 g of yttrium (0.181 moles; Aldrich®) and 100 ml of anhydrous toluene. 13 mg of $HgCl_2$ is then added to the reaction medium. The reaction medium is then refluxed whilst stirring for 2 days. After filtration of the medium, the filtrate is concentrated and then purified by crystallisation in a dichloromethane/toluene mixture (50/50). In this way 32 g of $Y_5O(OiPr)_{13}$ is obtained (yield 72%).

15 g of $Y_5O(OiPr)_{13}$ (0.0122 moles) in solution in 50 ml of anhydrous tetrahydrofurane and 27 g of 2-hexafluoropropanol are mixed (exothermic reaction). In this way $Y[OCH(CF_3)_2]_3$ is obtained, which is then purified in anhydrous hexane (34 g, yield 95%).

EXAMPLE 3

Synthesis of $Yb[OCH(CF_3)_2]_3$

A mixture of 2-methoxyethanol and 2-propanol (30/70 ml) is added to a mixture consisting of 18.3 g of ytterbium (0.105 moles, Aldrich®) and 100 ml of anhydrous toluene. The reaction medium is refluxed whilst stirring for 2 days. After filtration of the reaction medium and crystallisation of the raw product, 33 g (80%) of $Yb(OCH_2CH_2OCH_3)_3$ is obtained.

25 g of 2-hexafluoropropanol is added to a solution of 20 g (0.05 moles) of $Yb(OCH_2CH_2OCH_3)_3$ in tetrahydrofurane (exothermic reaction). After filtration of the reaction medium and crystallisation of the raw product in anhydrous hexane, 32 g of $Yb[OCH(CF_3)_2]_3$ is obtained (yield 96%).

EXAMPLE 4

Synthesis of $Tm[OCH(CF_3)_2]_3$

A mixture of 2-methoxyethanol and 2-propanol (7.5/7.5 ml) is added to a solution of 1 g (5.9 mmol, Aldrich®) of thulium in 20 ml of toluene. The reaction medium is then refluxed whilst stirring for 2 days. After filtration of the reaction medium, a colourless filtrate is obtained which is concentrated and then purified by crystallisation. In this way 1.67 g of $Tm(OCH_2CH_2OCH_3)_3$ is obtained (yield 72%).

2.1 g of 2-hexafluoropropanol is added to a solution of 1.67 g of $Tm(OCH_2CH_2OCH_3)_3$ in anhydrous tetrahydrofurane. The reaction is exothermic. In this way, after crystallisation in a mixture of anhydrous pentane and ethyl ether, 2.06 g of $Tm[OCH(CF_3)_2]_3$ is obtained (yield 98%).

EXAMPLE 5

Synthesis of $BaF_2$ 5 g of barium (36 mmol) is put in solution in 50 ml of anhydrous tetrahydrofurane, and then 12.2 g of 2-hexafluoropropanol is added to form the barium fluoroalkoxide of Example 1. The reaction is exothermic. The reaction medium, which has become clear, is hydrolysed at room temperature by the addition of 6.48 g of water. The hydrolysis is exothermic. In this way 6.3 g of $BaF_2$ powder is obtained.

Figure 2:
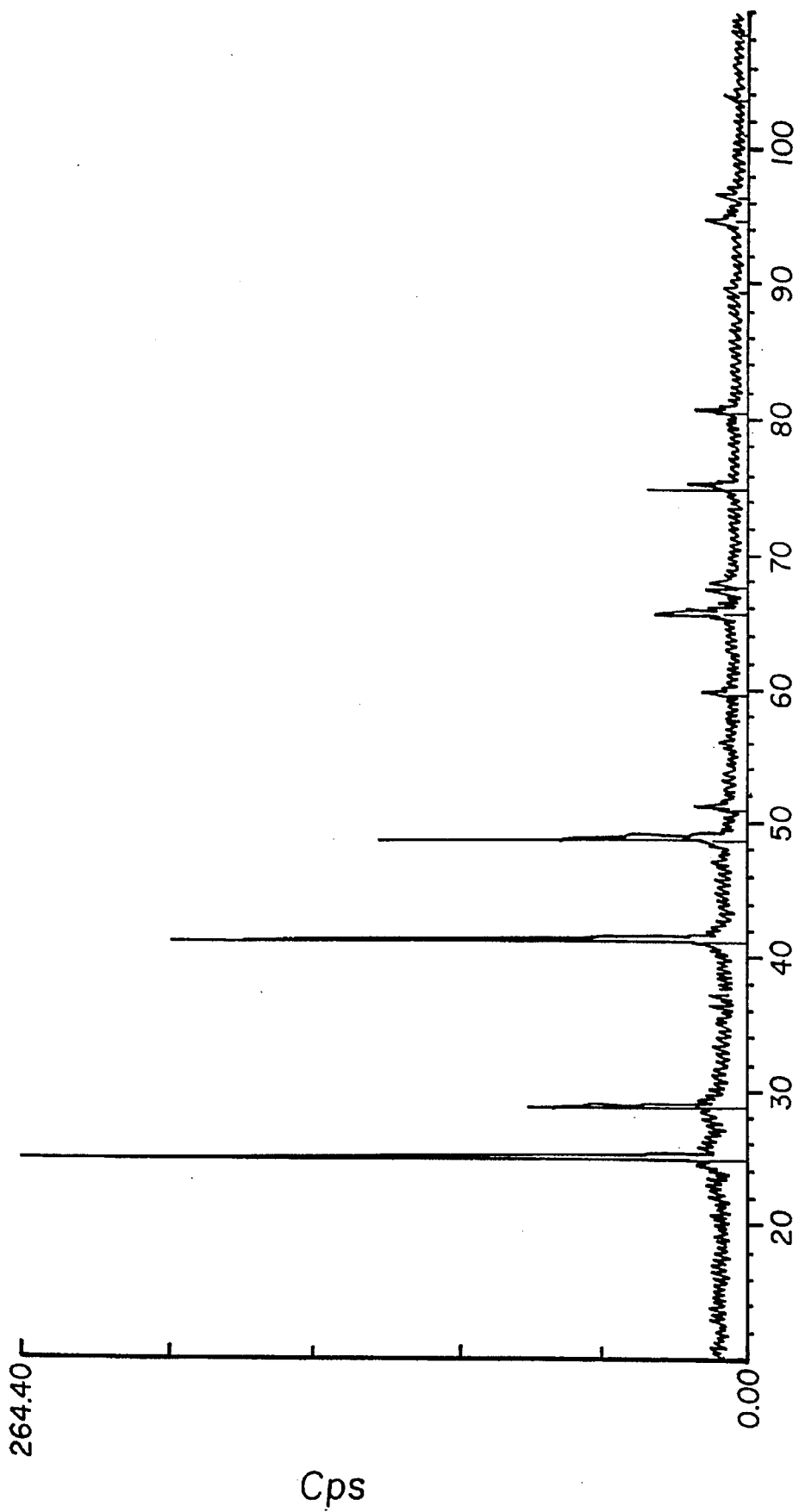
FIG. 2 is an X-ray diffraction spectrum of a barium fluoride powder obtained by hydrolysis of the barium fluoroalkoxide of FIG. 1.

FIG. 2 is an X-ray spectrum of the $BaF_2$ powder thus obtained.

The same experiment was carried out by hydrolysing the reaction medium with a solution of HF and a solution of $HClO_4$. In this case, the hydrolysis is more rapid and $BaF_2$ is obtained as before.

EXAMPLE 6

Synthesis of $MgF_2$ 100 ml of absolute methanol is added to 5 g of magnesium in chip form. The reaction is exothermic. A white suspension is thus obtained. 70 g of 2-hexafluoropropanol is then added to this suspension drop by drop in order to form the corresponding magnesium fluoroalkoxide. The reaction is exothermic and the reaction medium clears. After eliminating the colloidal residues by filtration, the clear filtrate is hydrolysed at room temperature by the rapid addition of 38 g of $H_2O$. 7.9 g of $MgF_2$ is then obtained.

EXAMPLE 7

Synthesis of $EuF_3$

In accordance with the method of the previous examples, fluorinated alcohol $HOCH(CF_3)_2$ was reacted with a europium alkoxide $Eu(OCH_2CH_2OCH_3)_3$. In this way europium fluoroalkoxide $Eu[OCH_2(CF_3)_2]$ was formed, which by hydrolysis made it to obtain perfectly crystallised europium fluoride, at room temperature. The quantity of water used is equal to 30 times the stoichiometric hydrolysis quantity.

Figure 3:
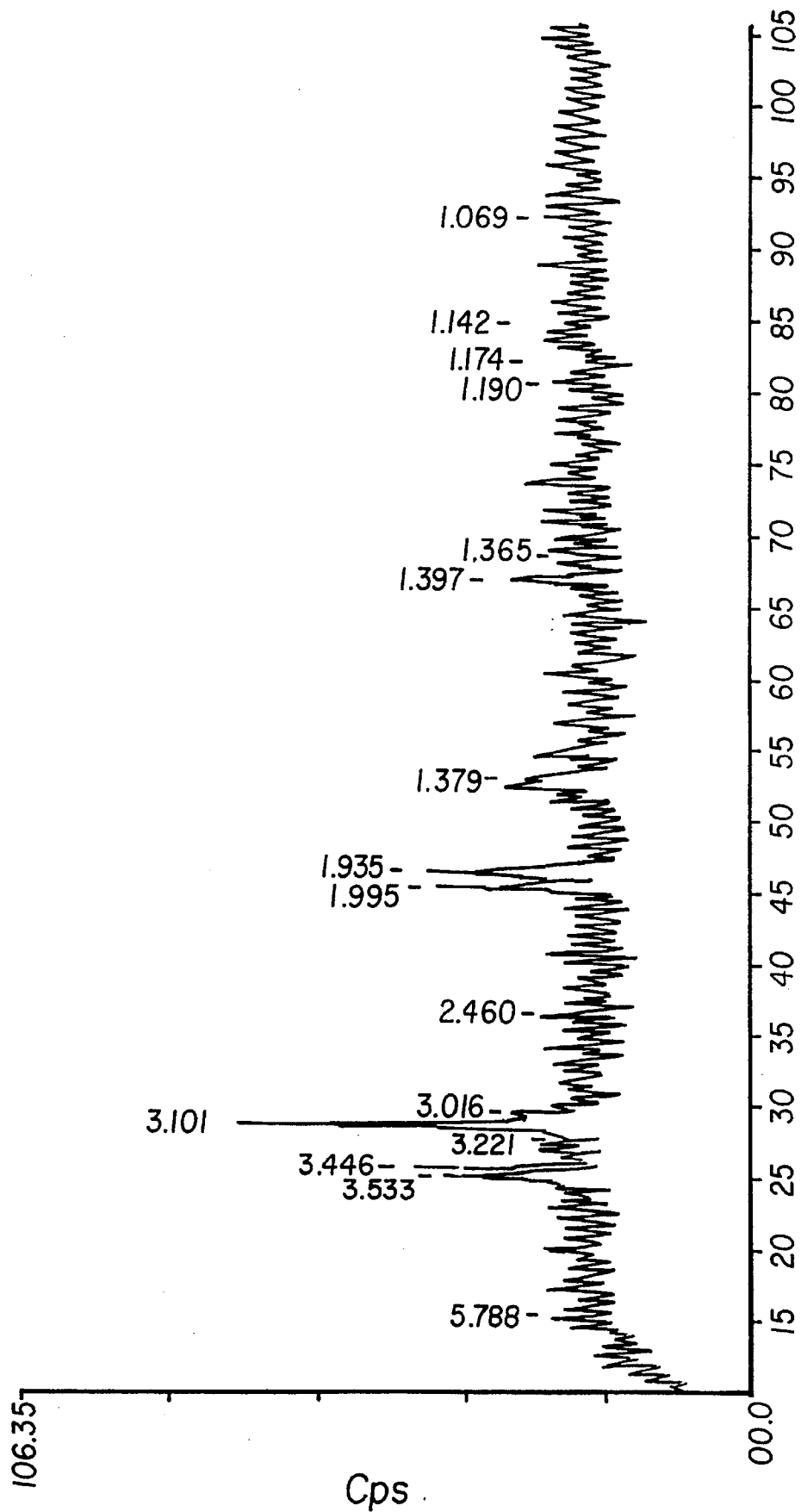
FIG. 3 is an X-ray diffraction spectrum of a europium fluoride powder obtained according to the process of the present invention.

FIG. 3 is an X-ray diffraction spectrum of the $EuF_3$ powder obtained.

EXAMPLE 8

Synthesis of a mixed rare earth and alkaline earth fluoride 4.03 g of $Ba[OCH(CF_3)_2]_2$ is added to 5 g of $Yb[OCH(CF_3)_2]_3$ in solution in 50 ml of anhydrous tetrahydrofurane. A second solution containing 5.71 g of $Yb[OCH(CF_3)_2]_3$ in anhydrous tetrafurane and 0.11 g of $Tm[OCH(CF_3)_2]_3$ is then added to this solution.

The mixture thus obtained is stirred strongly for 1 hour and then transferred to a Teflon reactor and hydrolysed with 40 ml of water containing 0.5 ml of 40% HF.

Figure 4:
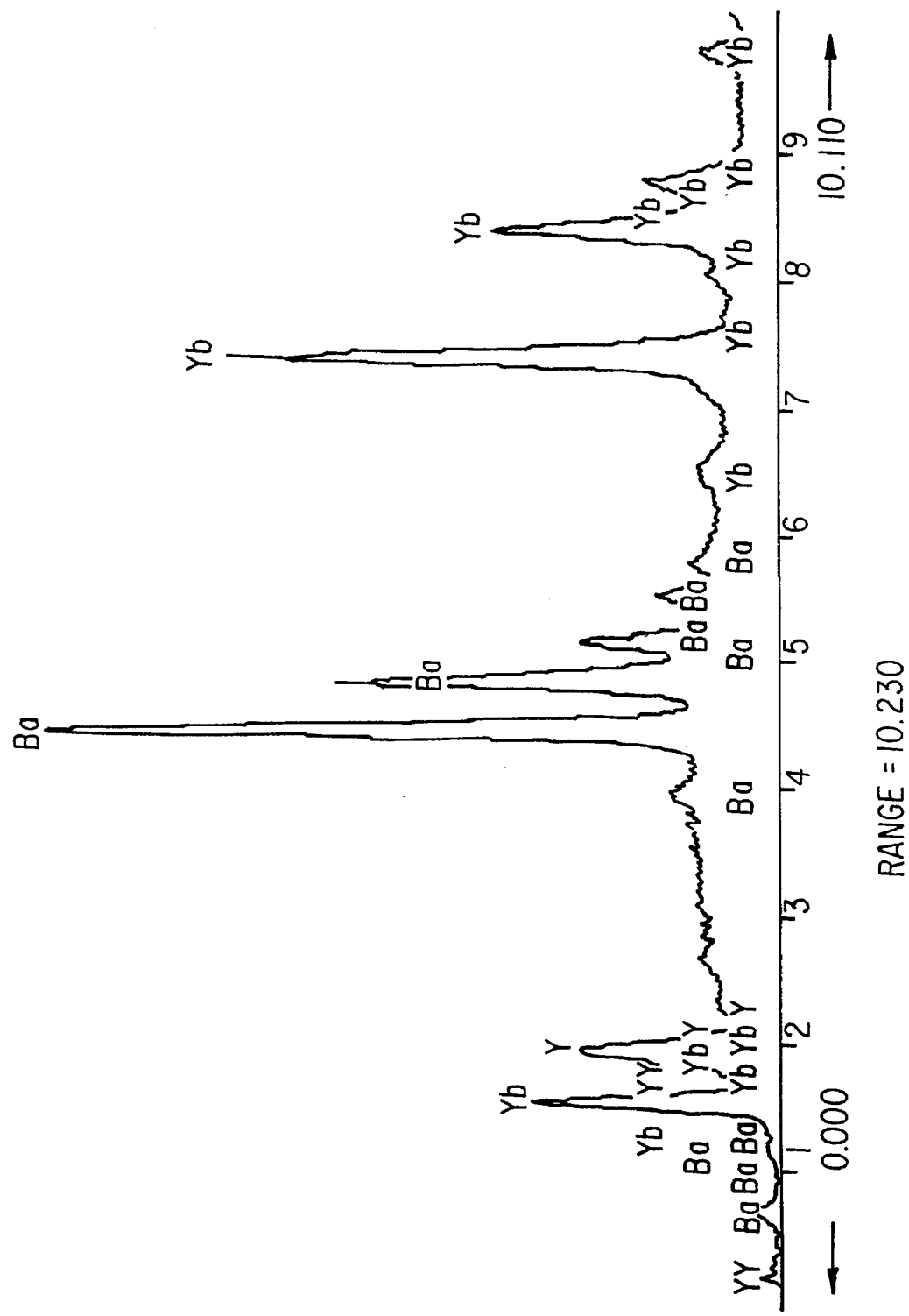
FIG. 4 is a spectrum obtained by energy dispersive X-ray microanalysis, of the compound $YYbBaTm_{0.1}F_x$ obtained by hydrolysis, at room temperature, of a mixture of rare earth and alkaline earth fluoroalkoxides as in Example 7.

A very rapid increase in the viscosity of the mixture is observed, which is maintained under strong stirring for one night. The reaction medium is then filtered and in this way, after drying, a white powder is obtained, the structure of which was confirmed by ED-XRMA (FIG. 4).

Figure 5:
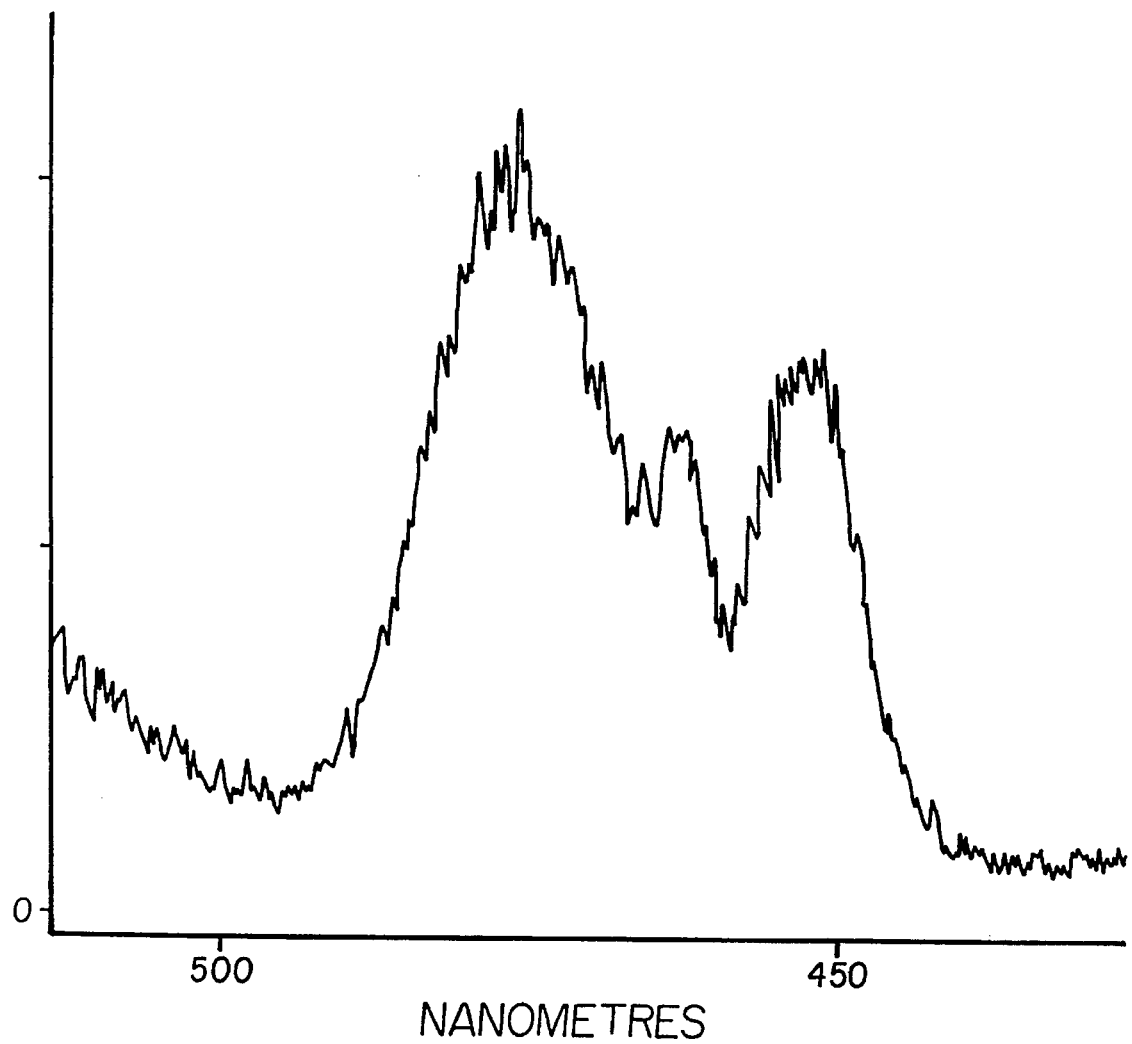
FIG. 5 is the emission spectrum of the compound $YYbBaTm_{0.1}F_x$ in powder form excited by laser at 650 nm.

This powder, when it is excited by a laser with a wavelength of 650 nm, emits blue light, as shown by FIG. 5.

EXAMPLE 9

Synthesis of a thin layer of $BaF_2$ fluoride

A cellulose substrate (Nadir® sold by Roth) is immersed in a solution of $Ba[OCH(CF_3)_2]$ (0.1M) in absolute ethanol, the system being maintained under an inert gas. The substrate is then withdrawn and left in the open air for 5 min. Hydrolysis takes place with atmospheric moisture.

After 5 min, the substrate is immersed into osmosed water in order to terminate the hydrolysis.

A layer of $BaF_2$ is thus obtained. Such layers are stable even when they are immersed in solutions having pH values varying between 8 and 12, for several days.

In order to measure the hydrophobia of the layers of $BaF_2$ of the invention, the wetting angle of the previously obtained layer and that of the cellulose substrate before deposition of the layer were measured:

|  | Wetting angle |
| --- | --- |
| Nadir ® cellulose | 36 ± 2 degrees |
| $BaF_2$ layer | 74 ± 4 degrees |

The results show that the process of the present invention makes it possible to obtain hydrophobic layers resistant to any variation in pH.

Tests showed that layers of variable thickness could be obtained by modifying the concentration of starting alkoxides and reimmersing the $BaF_2$ layer in the starting alkoxide solution.

EXAMPLE 10

Synthesis of $BaBr_2$ 5.7 g of barium (41 mmol) is mixed, under argon, with 50 ml of anhydrous tetrahydrofurane, and then 4 ml of 2-bromoethanol is added drop by drop in order to form barium bromoalkoxide. The reaction is not exothermic and it is catalysed by the controlled introduction of two equivalents of hexamethyldisilazane. The reaction is accelerated by introducing 30 ml of methanol into the reaction medium. The reaction medium, which is stirred, becomes clear.

When the barium is completely used up, the solution is concentrated and a white solid is obtained, barium bromoalkoxide Ba(OCH$_2$CH$_2$Br).

Ba(OCH$_2$CH$_2$Br) was also obtained by direct alcoholisation of Ba(OEt)$_2$.

The white solid thus obtained is solubilised in ethanol. Hydrolysis of the medium is then effected by the addition of a quantity of water 10 to 30 times the stoichiometric hydrolysis quantity. The reaction is exothermic. After stirring for 30 min, a white crystallised powder is obtained. This powder was analysed by FT-RAMAN spectrometry. The spectrum obtained has two very fine large bands at 416 and 442 cm$^{-1}$. Comparison of this spectrum with the spectrum obtained with BaBr$_2$,H$_2$O manufactured by Aldrich shows that barium bromide has indeed been obtained.

The X-ray diffractometry spectrum of the powder obtained shows unambiguously the presence of a crystalline phase identical to that of the commercial product.

Consequently the present process makes it possible to manufacture extremely pure hydrated barium bromide from the metal at room temperature.

EXAMPLE 11

Synthesis of SrBr$_2$ 3.8 g of strontium (4.2 10$^{-2}$ mol) is dissolved in 80 ml of methanol under argon atmosphere. The reaction is exothermic with the release of hydrogen. When the strontium is completely used up, a crystallised white powder corresponding to Sr(OCH$_3$)$_2$ is recovered.

8 g of Sr(OCH$_3$)$_2$ (12.3 mmol) is dissolved under argon atmosphere in 60 ml of anhydrous tetrahydrofurane, and then 2 ml of 2-bromoethanol is added drop by drop.

In this way a white solid is obtained which is dissolved in 30 ml of methanol. Hydrolysis of the medium is then effected by the addition of 15 ml of water. Fine colloidal particles in suspension are thus formed. After 30 min of stirring, the solution is concentrated: a white crystallised power is obtained.

This powder, analysed by FT-RAMAN spectrometry and X-ray diffractometry, has a structure identical to that of the commercial product SrBr$_2$ manufactured by Strem®.

EXAMPLE 12

Synthesis Of BaBrF 3.5 g of Ba[OCH(CF$_3$)$_2$]$_2$ (7.5 mmol synthesised in accordance with the method of Example 1) in solution in 40 ml of anhydrous methanol is added to 2.9 g of Ba(OCH$_2$CH$_2$Br)$_2$ (7.5 mmol synthesised in accordance with the method of Example 10) in solution in 40 ml of anhydrous methanol. The reaction medium is stirred for 3 hours at room temperature and then concentrated. In this way a white powder Ba(OCH$_2$CH$_2$Br) (OCH(CF$_3$)$_2$ is isolated, characterised by FT-RAMAN.

This barium bromofluoroalkoxide in solution in 20 ml of methanol is hydrolysed by the addition of a 0.2M solution of hydrofluoric acid. The solution becomes cloudy and, after concentration, a slightly coloured solid is obtained.

This powder is analysed by FT-RAMAN, ED-XRMA and X-ray diffractometry.

The FT-RAMAN spectrum has two bands at 212.3 and 238.9 cm$^{-1}$, which correspond to the Ba-F bond.

X-ray spectrometry microanalysis confirms the presence of the three elements Ba, Br and F.

The diffraction spectrum is entirely comparable to the reference spectrum of BaBrF crystals.

EXAMPLE 13

Another method of synthesising BaBrF 25.6 g of Me$_4$NOH,5H$_2$O is heated at 100° C. in order to remove the water by azeotropic distillation. The anhydrous Me$_4$NOH solid is then dissolved in 60 ml of anhydrous ethanol, and then 30 g of anhydrous BaBr$_2$ is added thereto. After stirring for half a day, a precipitate of NMe$_4$Br is recovered. This compound is then dissolved in 9.4 ml of hexafluoropropanol. After stirring, the solution is filtered and the solvent is removed under vacuum. 40 g of (CF$_3$)CHOBaBr is thus recovered in the form of a whim solid.

(CF$_3$)CHOBaBr is solubilised in methanol and this solution is hydrolysed by the addition of water. The solid obtained is placed in an oven at 250° C. in order to eliminate any organic species still present.

The heat treatment is not obligatory. The same product was obtained after drying at a much lower temperature but for a longer time.

X-ray diffraction analysis confirms that BaBrF has indeed been obtained.

The invention has been described in detail with particular reference to certain preferred embodiments thereof, but it will be understood that variations and modifications can be effected within the spirit and scope of the invention.

I claim:

1. Process for preparing rare earth and/or alkaline earth metal halides which comprises:

(1) forming a homogeneous solution by mixing an alkoxide species in an anhydrous organic solvent, said alkoxide species consisting of rare earth and/or alkaline earth halogenoalkoxides corresponding to one of the following formulae:

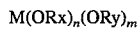
    $$M(ORx)_n(ORy)_m$$

or

    $$M(ORx)_nX_m$$

wherein M is a rare earth or an alkaline earth, Rx and Ry are each separately alkyl groups substituted by at least a halogen atom, X is a halogen and n and m are such that the sum of n and m is equal to the valency of M, provided that n is higher than 0; and (2) adding to this solution a quantity of water which is at least stoichiometric for hydrolyzing the halogenoalkoxides to form a gel consisting essentially of rare earth and/or alkaline earth metal halides.

2. Process according to claim 1, in which the hydrolysis is catalysed by means of an acid.

3. Process according to claim 2, in which the pH of the hydrolysis is between 1 and 3.

4. Process according to claim 1, in which the solvent is chosen from amongst tetrahydrofurane, alcohols or ketones.

5. Process according to claim 1 in which said homogeneous solution is coated on a support before adding water.

6. Process according to claim 5, in which the hydrolysis is effected with atmospheric moisture.

7. Process according to claim 5 further comprising the step of preparing layers of rare earth and/or alkaline earth fluorides.

8. Process according to claim 5 further comprising the step of preparing layers of rare earth and/or alkaline earth bromide.

9. Process according to claim 5 further comprising the step of preparing layers of rare earth and/or alkaline earth bromofluoride.

10. Process according to claim 1 in which the quantity of water is from the stoichiometric quantity to 5 times said stoichiometric quantity.

* * * * *